UNITED STATES PATENT OFFICE.

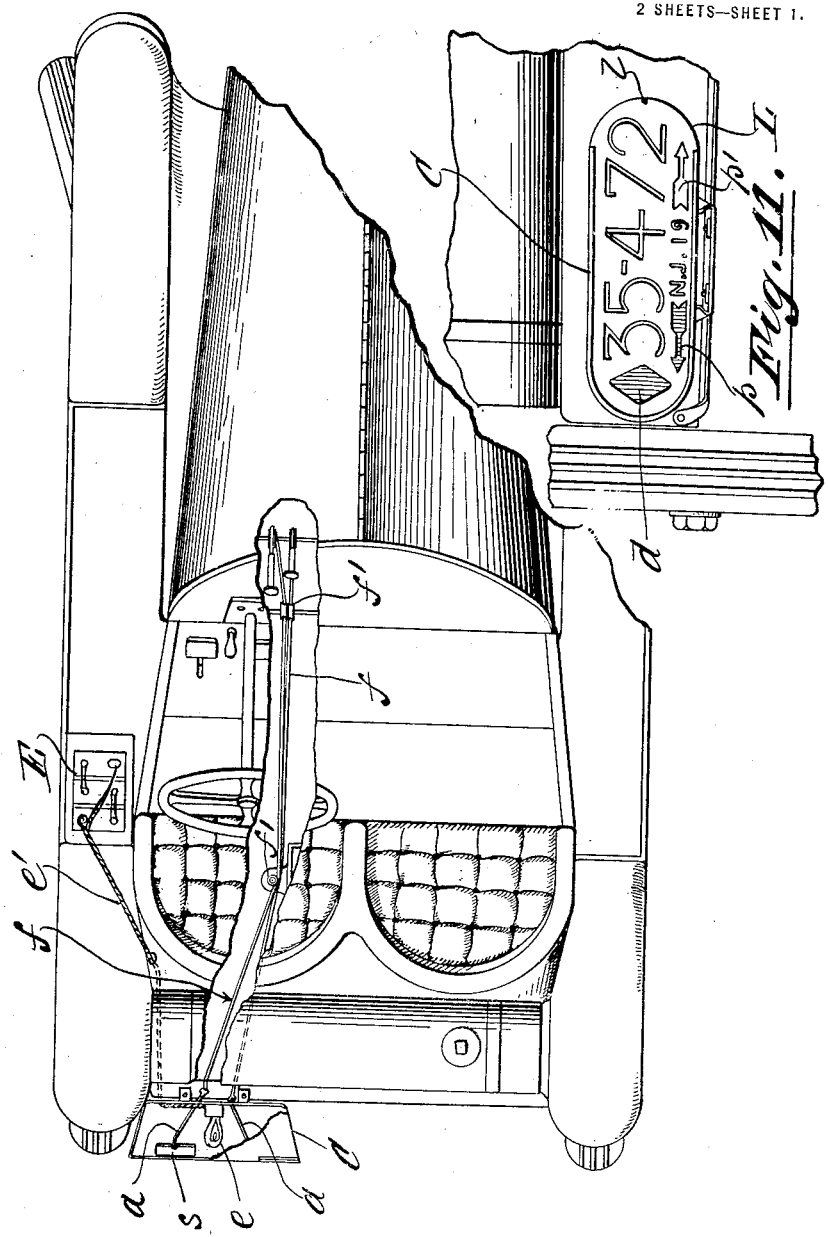

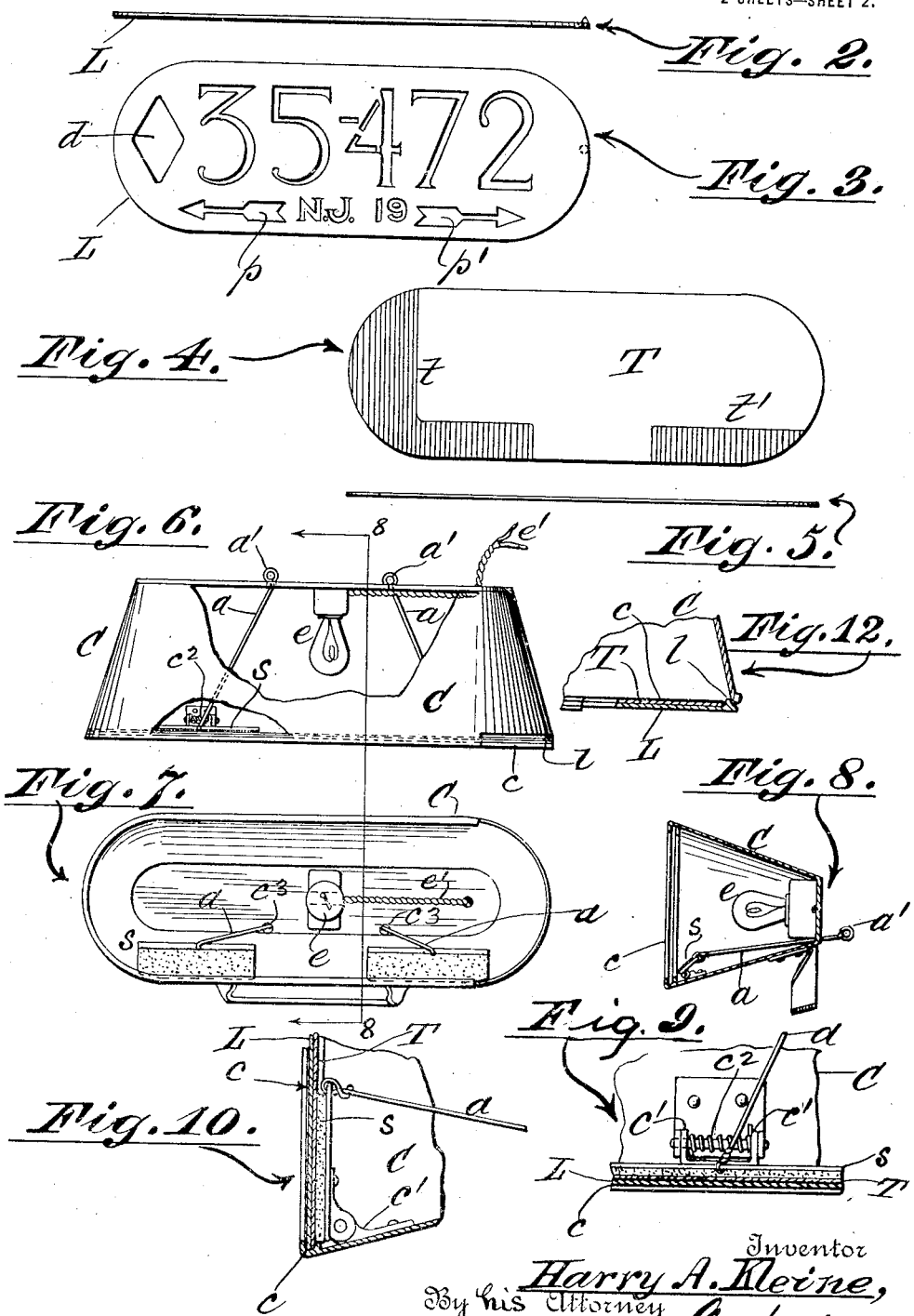

HARRY A. KLEINE, OF JERSEY CITY HEIGHTS, NEW JERSEY.

AUTO-LICENSE-INDICATING DEVICE.

1,342,850.      Specification of Letters Patent.      Patented June 8, 1920.

Application filed December 10, 1919. Serial No. 343,982.

*To all whom it may concern:*

Be it known that I, HARRY A. KLEINE, a citizen of the United States, and a resident of Jersey City Heights, county of Hudson, and State of New Jersey, have invented certain new and useful Improvements in Auto-License-Indicating Devices, of which the following is a specification.

My improvements relate not only to means for rendering visible the license number of an automobile after daylight but also for intimating the direction of travel of the vehicle at night,—the object being mainly to afford a simple, inexpensive, but effective indicator of the character designated.

To this end the invention consists in the specific construction and arrangement of parts described and claimed,—distinctive features being the combination of a stenciled license plate with a partly colored transparent back plate, and the means for indicating contemplated change in direction of travel, all as hereinafter more fully set forth.

In the accompanying drawings,

Figure 1, is a top view of an autocar, broken away in part, to illustrate the practical application of my invention thereto;

Fig. 2, is a top edge view of the license plate;

Fig. 3, is an elevation of the face thereof;

Fig. 4, is an elevation of the partly colored transparent back plate;

Fig. 5, is an edge view thereof;

Fig. 6, is a top view, partly broken away, of the lamp casing;

Fig. 7, is a front view of the lamp casing etc., with the license plate and its transparent back plate omitted;

Fig. 8, is a vertical section through the lamp casing, taken upon plane of line 8—8, Figs. 6 and 7;

Fig. 9, is a detail view showing one of the automatically closing shutters;

Fig. 10, is a sectional detail showing same on a larger scale;

Fig. 11, is a face elevation of my device as a whole mounted on the rear of an automobile, indicated in part;

Fig. 12, is a detail view showing means for detachably holding the license plate and transparent back plate in position in the front of the casing.

The main object of my invention being the visibility of the license number, etc., after dark, I provide a stenciled license plate L, and mount it in the front part of the casing C, containing an electric lamp $e$, or other illuminating means, as may be found most expedient. In the arrangement shown in the drawings, an incandescent lamp $e$, is connected by cable wires $e'$, with an electric battery E, or other source of electricity, suitably positioned on the vehicle.

The stenciled license plate L, is preferably made of metal, and is removable from the casing C,—being slidably mounted in a groove $c$, formed for its reception in the front edges of the casing C. The partly colored transparent back plate T, is also removably mounted in said groove $c$, contacting with the back of the license plate L, and conforming in shape thereto. The two plates L and T, may be retained in position in the casing by means of any desired mechanical expedient, as by a snap boss or shoulder $l$, on the license plate L, engaging with the edge of the casing C, as indicated in detail in Fig. 12.

In addition to the stenciled license number, etc., the license plate L, is formed with the rear danger light opening $d$ (in the present case shown of diamond shape, although the configuration thereof is not material) and with the two pointer openings $p$, $p'$, of arrow shape as shown, or of any other shape or configuration desired provided they indicate opposite lateral directions as related to the direct, normal line of travel of the car. The rear danger light opening $d$, and the two lateral direction indicators $p$, $p'$, are covered and closed at the rear of the license plate L, by the colored (red) portions $t$, $t'$, of the transparent back plate T,—the rest of said back plate T, being preferably colorless, so as to transmit the light unaltered through the license number, location, and year stenciling. The danger light opening $d$, has no curtain or shutter, and admits the transmission of light from the lamp $e$, at all times, as do the stencilings for license number, location, and year; but the pointer spaces $p$, $p'$, are covered normally by automatically closing shutters $s$, $s'$, which are withdrawn therefrom by positive means, as may be required, to indicate any intended change in direction of travel. Thus, if the vehicle is to be turned to the left, the shutter $s$, is withdrawn from the rear of the left hand pointer $p$, allowing the latter to transmit light and indicate the proposed change of direction of travel, as indicated in Fig. 11; whereas if a change of route is contemplated to the right of the vehicle, the pointer $p'$, is uncovered,—the shutter of the left hand pointer $p$, being closed.

It is obvious that various forms of shutters may be used in connection with the direction indicators without departing from the spirit and intent of my invention in this respect,—the essential features in this connection being the automatic closing of the shutter and positive means for retracting same when required. Thus in the drawings I show each shutter $s$, $s'$, pivotally supported at its lower edge between lugs $c'$, $c'$, with springs $c^2$, $c^2$, so positioned as to tend constantly to press the shutters $s$, $s'$, against the inner side of the transparent plate T, thereby normally closing the pointer stencils $p$, $p'$, against the transmission of light. To the upper edge of each shutter $s$, $s'$, is articularly connected a link $a$, $a$, which extends through the casing C, and through a perforation $c^3$, $c^3$, formed for it in the back plate of said casing, as shown in Figs. 6 and 7. These links $a$, $a$, may be made of wire and formed with loops $a'$, $a'$, which not only afford means of attachment to flexible ligaments $f$, $f$, but also perform the function of stops to limit the outward thrust of the shutters $s$, $s'$, when the plates L and T, are withdrawn from the slot $c$, of the casing, although the shutters $s$, $s'$, are designed to rest normally against the back plate T, as before intimated, and for this reason are preferably faced with felt or other material adapted to exclude the passage of light from the lamp $e$.

The ligamentous connections $f$, $f$, extend from the links $a$, $a$, over suitable pulleys $f'$, $f'$, to levers or pedals conveniently positioned at or near the dash board of the machine, as will be understood by reference more particularly to Fig. 1, of the drawings, so that the shutters can be conveniently manipulated as desired for use during the exigencies of travel.

It is of course to be understood that the optional and individual retraction of the shutters $s$, $s'$, may be effected from the chauffeur's seat in the car by means of various well known mechanical expedients with like result, so that I do not limit myself to the identical means shown.

What I claim as my invention and desire to secure by Letters Patent is,

1. An auto-license indicating device of the character designated, comprising a casing, illuminating means therein, a stenciled license plate formed with rear danger and direction indicator openings and positioned in the front of the casing, and a transparent back plate also positioned in front of the casing, and formed with colored portions coincident with the danger and direction indicators in the license plate, together with spring shutters in the casing arranged to normally cover the direction indicators, and positive means for optionally and individually retracting said shutters from the vehicle seat, for the purpose described.

2. An auto-license indicating device of the character designated, the same comprising a casing, a stenciled license plate therein, illuminating means in said casing, a partly colored back plate behind the stenciled plate, means for holding said plates in position, the license plate being formed with a rear danger light opening, and pointer openings covered by the colored portion of said back plate, shutters for the pointer openings, and positive means for actuating said shutters, the rear danger light opening being shutterless, said shutters being faced with means to exclude the passage of light.

HARRY A. KLEINE.

Witnesses:
Geo. Wm. Miatt,
Dorothy Miatt.